United States Patent
Balaji

(10) Patent No.: US 7,657,652 B1
(45) Date of Patent: Feb. 2, 2010

(54) SYSTEM FOR JUST IN TIME CACHING FOR MULTIMODAL INTERACTION

(75) Inventor: Thenthiruperai S. Balaji, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 818 days.

(21) Appl. No.: 10/457,308

(22) Filed: Jun. 9, 2003

(51) Int. Cl.
*G06F 15/16* (2006.01)

(52) U.S. Cl. ............... 709/242; 709/201; 709/226; 709/213; 709/217

(58) Field of Classification Search ............ 709/227, 709/201, 226, 213, 217; 711/133; 707/1
See application file for complete search history.

(56) References Cited

U.S. PATENT DOCUMENTS

| | | | |
|---|---|---|---|
| 6,427,172 B1 | 7/2002 | Thacker et al. | |
| 6,505,202 B1* | 1/2003 | Mosquera et al. | 707/10 |
| 6,807,607 B1* | 10/2004 | Lamparter | 711/133 |
| 7,099,926 B1* | 8/2006 | Ims et al. | 709/217 |
| 7,130,964 B2* | 10/2006 | Ims et al. | 711/118 |
| 2002/0087798 A1* | 7/2002 | Perincherry et al. | 711/133 |
| 2004/0059705 A1* | 3/2004 | Wittke et al. | 707/1 |
| 2006/0020704 A1* | 1/2006 | Balasuriya | 709/227 |
| 2006/0106935 A1* | 5/2006 | Balasuriya | 709/227 |

OTHER PUBLICATIONS

Feldmann, http://www.cs.wisc.edu/~cao/WISP98/html-versions/anja/proxm_wisp/node2html, May 18, 1998, 2 pages.
Nikfeld et al., "Multimodal Interface Architecture for Mobile Data Services", http://userver.ftw.at/~niklfeld/pub/niklfeld_tcmc2001.pdf, 5 pages.
"Adaptive Web Caching", http://irl.cs.ucla.edu/AWC/home.html, Feb. 10, 2003, 1 page.
"The Edge", www.3com.com/the_edge, Spring 2000, 8 pages.
Pitkow et al., "A Simple Yet Robust Caching Algorithm Based on Dynamic Access Patterns", http://archive.ncsa.uiuc.edu/SDG/IT94/Proceedings/DDay/pitkow/caching.html, Mar. 18, 2003, 11 pages.

* cited by examiner

*Primary Examiner*—William C Vaughn, Jr.
*Assistant Examiner*—Djenane M Bayard

(57) ABSTRACT

A system for of optimizing delivery of multimodal content based on an adaptive, predictive caching algorithm. The system includes predictive caching software that receives at least one input regarding a preferred modality (e.g., audio, visual, or touch) for a particular application state. An application can have any number of states, each of which can, in turn, be presented in a different mode. The presentation mode for any particular application state can be selected by a user's input or request. In response to at least one input, the value of a weight variable can be modified or maintained. The value corresponds to a preferred presentation mode for an application state. The system can cache content for more efficient delivery in at least one presentation mode according to the weight variable.

16 Claims, 3 Drawing Sheets

SYSTEM FOR JUST IN TIME CACHING FOR MULTIMODAL INTERACTION

BACKGROUND

1. Field of the Invention

The present invention relates to wireless communications devices and, more particularly, to optimizing delivery of multimodal content.

2. General Background

Many people are increasingly relying on the Worldwide Web to obtain information. In addition to laptop and desktop computers, many wireless devices, such as wireless telephones and PDAs, can now be used to access the Worldwide Web. In general, such wireless devices are able to act as wireless client devices in sessions with application servers. During such sessions, the wireless client devices receive, over an air interface, content formatted for a given presentation mode. Such content may include voice, text, or graphic information. Such wireless client devices also transmit information to servers during interactive sessions, and this information may originate as voice or non-voice (graffiti, touch input, or keypad input, for example) input from users. Content that contains information in more than one format, such as audio and graphics, may be referred to as multimodal content.

Presentation mode refers to the way a user interface of the wireless device presents the multimodal content to the user. For example, a wireless device may have a browser function to allow content to be presented in a screen-based presentation mode, e.g., to be displayed on a screen one screen at a time. Content that can be provided to browsers built into small devices (that is, mini or micro browsers) is often written to render a special markup language, such as the Wireless Markup Language (WML), Handheld Device Markup Language (HDML), or eXtensible HyperText Markup Language (XHTML). These markup languages facilitate interaction on the smaller screens and specialized browsers that handheld wireless devices typically use.

Presentation modes other than screen-based visual modes are also possible. For example, serving nodes can receive content written in a voice-based markup language, such as Voice Extensible Markup Language (VoiceXML) or Speech Application Language Tags (SALT). This content can then be interpreted and processed for presentation to users as voice-based information. Similarly, users of wireless client devices can input information or make selections in various modes, such as voice (e.g., speaking commands or data) or touch (e.g., tapping a screen, typing letters and numbers).

Some wireless devices and systems are multimodal, meaning they are able to present content and receive user input in more than one mode. Wireless systems can support both sequential and simultaneous multimodality. Sequential multimodality permits seamless switching between visual and voice modes. Simultaneous multimodality permits visual and voice mode to be active at the same time.

User experience is enhanced when content can be delivered quickly to handheld devices, but fast response time can be difficult to achieve with large applications. For an acceptable user experience, delivery of voice content should be nearly instantaneous; streaming of audio content requires an infrastructure to support streaming and has its own drawbacks. Regardless of the audio content, a multimodal document will contain code that will be part of the document links to audio files and grammar files. If the grammar files have to be downloaded every time the document is presented, there will be latency due to bandwidth restrictions and processing these requests. Caching content can dramatically improve delivery speed for large applications and web objects, but caching any and all content, in all possible presentation and input modes (modalities) that a person might use can be impractical due to the large amount of memory that would be required.

SUMMARY

In one aspect, a method for optimizing delivery of multimodal content is provided. The method includes receiving one or more inputs regarding at least one preferred presentation mode associated with an application state. In response to the input, the value of a weight variable can be modified or maintained, the value of the variable corresponding to a preferred presentation mode for the application state. The system can cache content for delivery in the preferred presentation mode according to the weight variable.

In another aspect, a predictive caching server for improving multimodal content delivery in a network that includes an application server and a multimodal service node is provided. The predictive caching server may include a processor, a memory, and a network interface by which input from the service node may be received. The predictive caching server may include a set of machine instructions stored in the memory. The instructions are executable by the processor to enable the caching server to receive an input that indicates at least one presentation mode. The instructions further provide for modifying, in response to the input, the value of a weight variable.

The caching server can transmit the weight variable to the multimodal service node, which may use it as a program variable to trigger and control updates of a local cache, thus improving delivery of content to users.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the invention are described below in conjunction with the appended figures, wherein like reference numerals refer to like elements in the various figures, and wherein.

DETAILED DESCRIPTION

Figure 1:
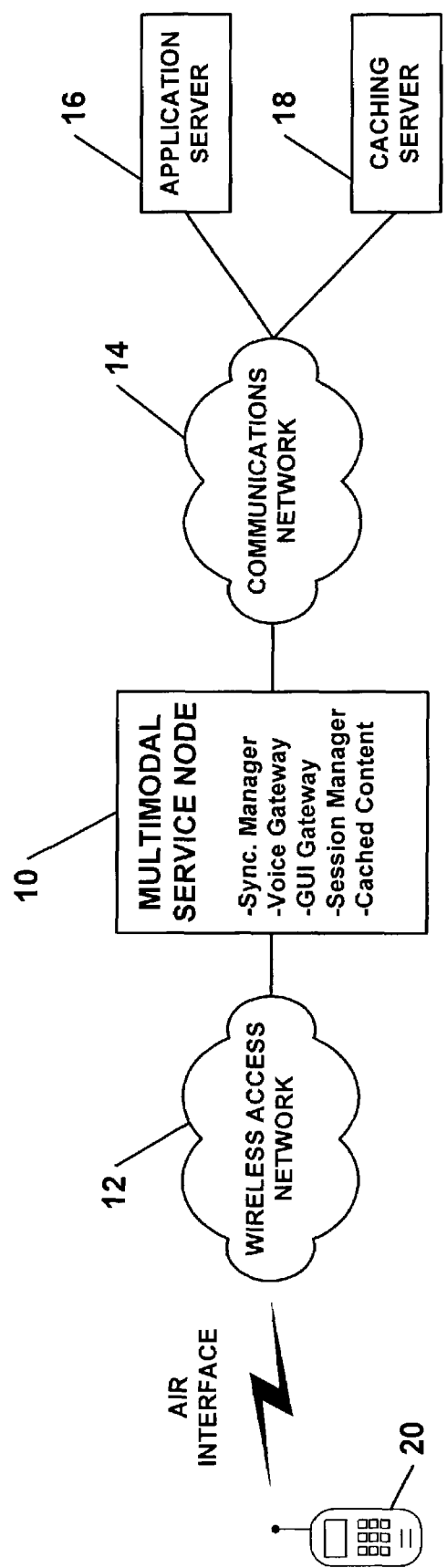
FIG. 1 is a diagram of a communication system in accordance with an exemplary embodiment of the present system.

Wireless telephone users who use voice and visual browsers interactively may be inconvenienced or dissatisfied more than conventional Internet users by slow application response times. Caching, or temporarily storing, objects (such as, for example, VoiceXML documents and XHTML documents between a server and a client can speed the delivery of content to users, thus improving a user's interactive experience. In caching, one or more servers store documents or objects locally, and this content can then be delivered directly to users from the local cache, without accessing the server that originally provided or generated the content. This is of great help when a large number of applications are served through the multimodal service node. Caching can also reduce network bandwidth and server load, since fewer requests will need to be handled by an application server. A system that can predictively cache content in the modality a user or multiple users are most likely to employ would conserve memory and other system resources while improving users' interactions with wireless applications.

An application state record is defined by the content, navigation points, current state of a session, and the presentation mode at any given point in a session. Navigation points include uniform resource identifiers (URIs), menu items, URLs, fragment identifiers, multimedia elements, grammars, and other data, that identify the specific session state or resource the client device is currently accessing. Because navigation points can be stored in an application state record, a user can execute numerous "back" or similar navigation commands from a browser or voice gateway, and the commands will function properly even after the user switches presentation modes.

One factor that accounts for the large amount of data that would be required for caching in any available presentation mode is the number of application states that would have to be stored. The amount of data that represents an application state (an application state record) can be large, and an application state record for one presentation mode is not interchangeable with an application state record for another presentation mode even though all the other data in an application state could be the same. Stated another way, a large proportion of data must be stored twice to present data to, or receive data from, a user in more than one presentation mode.

Caching objects for multimodal applications can especially improve performance when a user interacts with or accesses very large applications or data files, or applications and data on a server that is far from the user. Such applications may be unacceptably slow if they are accessed directly, without caching. Interaction with large applications via wireless devices may, in fact, become impractical without local caching due to the slow response a user would likely get to his or her requests if requested data or objects must traverse many entities on a network.

Because simply changing presentation modes results in a new, unique application state, caching content in a presentation mode that is rarely or never used is inefficient. For example, storing all the data that represents Chicago's weather report in voice presentation mode yields no performance improvement if a user chooses to access the weather report in text or graphic mode. Furthermore, any memory used for caching content in an unused presentation mode is simply wasted. Thus, caching that is based on need ("just in time" caching) will enhance the efficiency of the system.

Architecture

In an exemplary embodiment, a system for predictively caching content is implemented in a network, as illustrated in FIG. 1, that includes a multimodal service node 10 that is an interface between a wireless access network 12 and a communications network 14. Communications network 14 (which may be or may include the Internet, or a part of it) can in turn be coupled to one or more application servers, such as application server 16, and to one or more predictive caching servers, such as caching server 18.

The functions performed by application server 16 and caching server 18 could be implemented with one or more interconnected, commercially available server-class computers such as the Sun Solaris, Dell NT, IBM AIX, or other servers. Caching Server 18 can communicate with numerous multimodal service nodes over a wide area—virtually anywhere that is accessible to communications network 14, directing each service node to cache content based on historical data and new information regarding the modality users are likely to select for particular types of content.

Multimodal service node 10 can include a synchronizing manager, a session manager, a voice gateway, and a graphical user interface (GUI) gateway. The functions of the synchronizing manager and the session manager could each be implemented by one or more server-class computers connected in a LAN configuration. The voice gateway and the GUI gateway may be stand-alone or integrated high-capacity interfaces that provide broadband connectivity between wireless access network 12 and communications network 14. Multimodal service node 10 could be capable of caching content in at least VoiceXML, XHTML, SALT, HTML, and WML markup languages to support wireless devices, and it may also include software to collect and transmit, to caching server 18, input data that indicates user-selected modalities.

The voice gateway in multimodal service node 10 provides an interface between a voice-based communication device, such as a telephone operating in voice mode, and a server that accepts non-voice-command inputs, such as application server 16. Generally, the voice gateway can receive spoken commands or data inputs from a user of wireless client device 20 and convert them to inputs that are recognized by application server 16. In addition, the voice gateway can receive content from servers and present it to the user as spoken responses to the user's queries or as voice prompts for further user inputs. For example, the voice gateway could transmit to the user the audio prompt: "Please enter your last name by spelling it." This is the voice-command equivalent to a text entry box that might be presented by application server 16 to a user in screen-based presentation mode. In response to the prompt, the user could spell his or her last name, just as a screen-based user would type his or her last name.

The GUI gateway that provides part of the functionality of multimodal service node 10 may be any commercially available or specialized high-density data service node. A primary function of the GUI gateway is to pass data traffic between users and the Internet, in text and graphic presentation modes.

Wireless access network 12 communicates with wireless client device 20 via an air interface, as shown. Wireless access network 12 may include elements such as mobile switching centers, base transceiver stations, base station controllers, and other elements to provide network connectivity to wireless client devices such as wireless client device 20, in the system. Because such network elements can be conventional components of a wireless access network, they are not described in detail here.

In addition, although wireless client device 20 is illustrated as a cellular telephone, those skilled in the art will recognize that the invention could be carried out using virtually any communication device, wireless or non-wireless, such as a wireless PDA, a conventional PDA in a synchronization cradle, a personal computer with a wireless network interface, Internet-compliant devices, or other devices. The wireless client device 20 ordinarily includes a processor and a memory, which can store applications to be executed by the processor. The applications may utilize components of the wireless client device 20 such as a speaker, a keypad, and a display to interact with a user.

The memory in wireless client device 20 can also contain a web browser application (such as the OpenWave™ Microbrowser) and one or more media content player applications. A media content player application enables the wireless client device 20 to receive media content from application server 16 and present it using the speaker and the display.

The application server 16 may store a web server application, a streaming media application, and media content. The web server application of application server 16 generally allows users to communicate with the application server 16 through a web page or web card, although it may support other methods of connections or other functions. Application servers such as application server 16 that sit as nodes on communications network 14 generally include memory (in a broad array of possible configurations) to store media content.

In operation, content from application server 16 could reach multimodal service node 10 (via communications network 14) in combinations of, for example, WML, HDML, VoiceXML, XML, SALT, or any combination of markup languages. If the user initially requested the content in voice-presentation mode by, for example, speaking a command that is recognized by the voice gateway in multimodal service node 10, the session manager would transmit the requested content to wireless client device 20 via the voice gateway. If the user subsequently requested to receive content in screen-based presentation mode, the session manager can maintain the same session with application server 16, but would route content to the graphical user interface gateway in multimodal service node 10 for processing and transmission to wireless client device 20 via wireless access network 12 and the air interface.

The content to be cached at multimodal service node 10 could be provided directly by application server 16, or it could also be retrieved from another web cache to possibly provide faster response. To facilitate this, multimodal service node 10 could communicate with other, neighbor caches using the Internet Cache Protocol (ICP). ICP is an existing, lightweight message protocol used to facilitate communication between Web caches, and it enables a cache to retrieve objects from the most appropriate location.

If content from application server 16 is cached in the appropriate presentation modes at multimodal service node 10, then the voice gateway, the GUI gateway, or both can support interactions with the user of wireless client device 20 without the need to receive or transmit data to and from application server 16 over communications network 14.

The functions carried out by the various network entities shown or described could be performed by a single or multiple entities in combinations and configurations other than those shown. Thus, the entities illustrated may represent logical functions rather than physical devices without departing from the spirit and scope of the present system.

Figure 2:
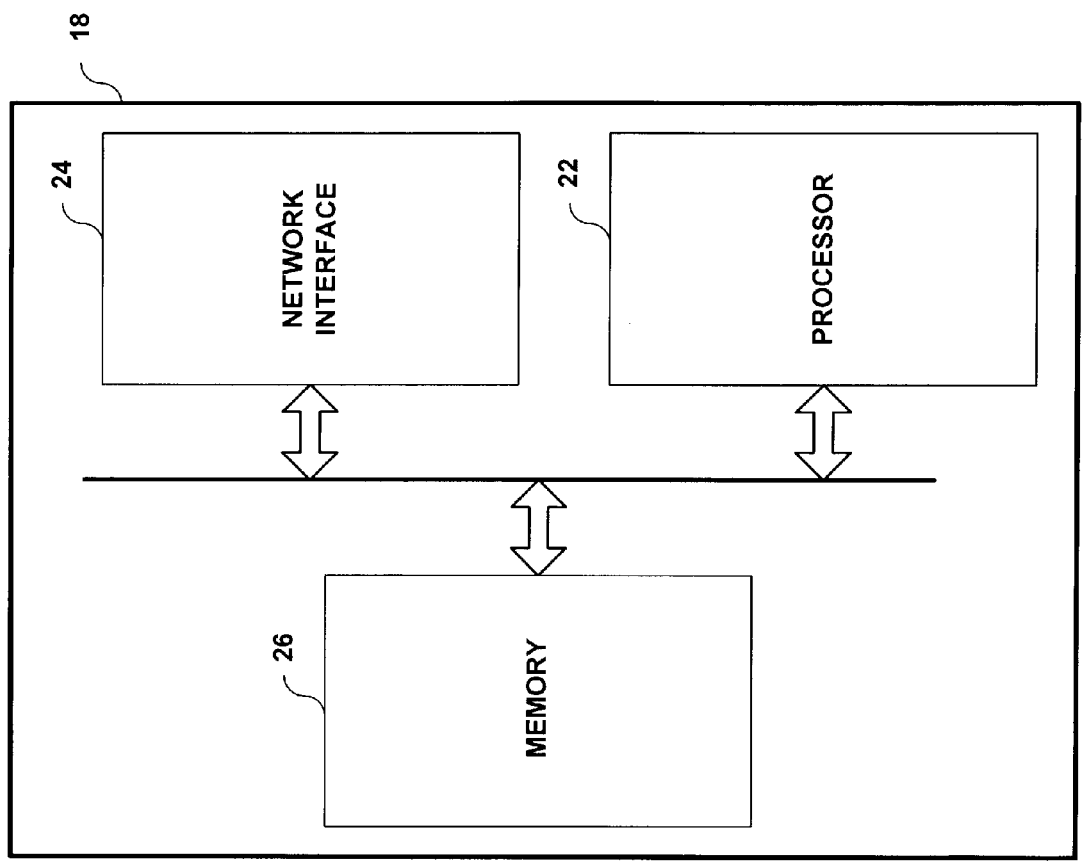
FIG. 2 is a block diagram of a predictive caching server capable of performing the functions of the present system.

FIG. 2 is a simplified diagram illustrating functional blocks that may be included within caching server 18. Generally, caching server 18 may include a processor 22, a network interface 24, and a memory 26, all communicatively interconnected. Processor 22 may include, for example, one or more integrated circuit microprocessors, and memory 26 may be a ROM, flash memory, non-volatile memory, optical or magnetic memory, or any combination of these memory types.

Memory 26 may include more than one physical element, and may store a number of software modules that are executable by processor 22 to carry out various functions described herein. The functionality of the various elements of caching server 18 can be best understood with reference to the flow chart of FIG. 3, as described below.

Operation

As it applies to multimodal, interactive sessions with wireless client devices, caching refers to the local storage of information, such as VoiceXML, XHTML, or WML documents, as well as prompts, and audio files that may be associated with applications and application states. Sets of allowed "grammars" can also be cached.

In voice command applications, a voice gateway may receive a spoken utterance from a user. The voice gateway then compares the utterance (typically as a combination of phonemes) to a set of allowed grammars so as to determine which grammar best matches the user's utterance and therefore represents what the user spoke. The gateway may then take an action that is programmatically keyed to the spoken grammar. For instance, if the user speaks the phrase "Tell me today's weather," the gateway may responsively report today's weather to the user. If the user instead speaks the phrase "Tell me tomorrow's weather," the gateway may responsively report a forecast of tomorrow's weather to the user. As described above, the information that defines "today's weather" or "tomorrow's weather" in voice mode may be cached within multimodal service node 10.

In multimodal content delivery systems, users may not always have a choice regarding what mode they can use to interact with an application, or in what mode content is received. In such systems, if content or objects are cached, it is only necessary to cache them in the known modality that is selected at the network level, since there is no need to cache content in a mode to which the user does not have access. For example, if a service provider configures a multimodal system so that driving directions are always presented to mobile users graphically, there is no need to cache driving directions in voice modality (e.g., VoiceXML) for that application state (e.g., output of driving directions).

If, however, a user has the option of selecting or switching modes—for example, between speech or audio mode and graphical mode, a need to determine what content should and should not be cached arises, especially where storage resources are limited. For example, suppose a user has the capability to switch between audio and visual delivery (or input of requests) in an application for getting driving directions. If usage data indicates that users rarely, if ever, choose to receive such directions in audio mode, an intelligent system could conserve system resources by only caching data in text mode for that particular application state. An intelligent or "predictive" caching system could also account for application size as well as other variables. Applications with a great deal of content would be more likely to be cached, since the use of applications with smaller amounts of content might result in acceptable latency even if they are not cached.

To allow for more efficient multimodal content delivery, the present system uses predictive caching software or a software algorithm (stored in caching server 18, for example) that keeps track of the presentation modes for each application state that is most likely to be used by (1) all users of the system and (2) any particular user of the system. The software can also use other information, such as how people use applications and application states at different times. Virtually any variable that affects the modality a user is likely to select, or that affects overall system performance and efficiency, can be used as an input to the system.

Caching server 18 provides access to data across a large geographic area. Those skilled in the art will appreciate, however, that weight variables and all predictive caching functions can also be carried out locally. For example, a single multimodal service node could be programmed to carry out the functions of caching server 18.

For example, the software can use location information and application size, in addition to historical data of user preferences, to determine the mode in which content should be cached. The system can also respond to the input of an initial prediction of presentation mode. On a continuing basis, the software can adapt to changes in users' preferred presentation modes to assign or change a weight variable that indicates the probability that users will choose a particular presentation mode while in any given application state.

Once the caching software in caching server 18 determines a likely presentation mode for an application state, the information regarding the mode is communicated to one or more serving nodes of a wireless service provider's network. In response, the serving nodes can cache data locally in the format of the predicted presentation mode. For example, if the software predicts that a user is most likely to use voice mode while in a particular application state, voice presentation mode data for that application state can be cached.

Since the best performance improvement is realized when large amounts of data are cached, caching data in one presentation mode rather than all modes or multiple modes can save a significant amount of memory and network capacity. Once information is cached, it can be delivered to users much more quickly (and possibly more smoothly—that is, with less jitter and interruption) than if it first had to traverse a number of network entities, each entity presenting a possible throughput limitation.

Caching only content in presentation modes that are predicted by a software algorithm as being more likely to be selected than other modes may be referred to as predictive caching. As a concrete example of this predictive caching, software residing on an enterprise server that is accessible to serving nodes may use an adaptive algorithm to "predict" that a particular mobile station user in Chicago is likely to access Chicago weather information that is stored on a server in California (or anywhere else on the network).

The software may further "predict" that the user is most likely to access the weather report in voice presentation mode. If there is a sufficient quantity of data required by the user for this application state, it may be cached by the serving node for Chicago, so that it can be delivered without the delays that may occur between Chicago and California without caching.

If the user decides to switch to text or graphical presentation mode, he can still get the information he needs, but system response may be slower since the information may not be cached in text or graphical presentation mode. If over time the user selects a different presentation mode for a given application state, the predictive caching software can adapt by saving historical data regarding presentation mode and thus cause the serving node for that user, or any group of users, to cache data in the new presentation mode.

Figure 3:
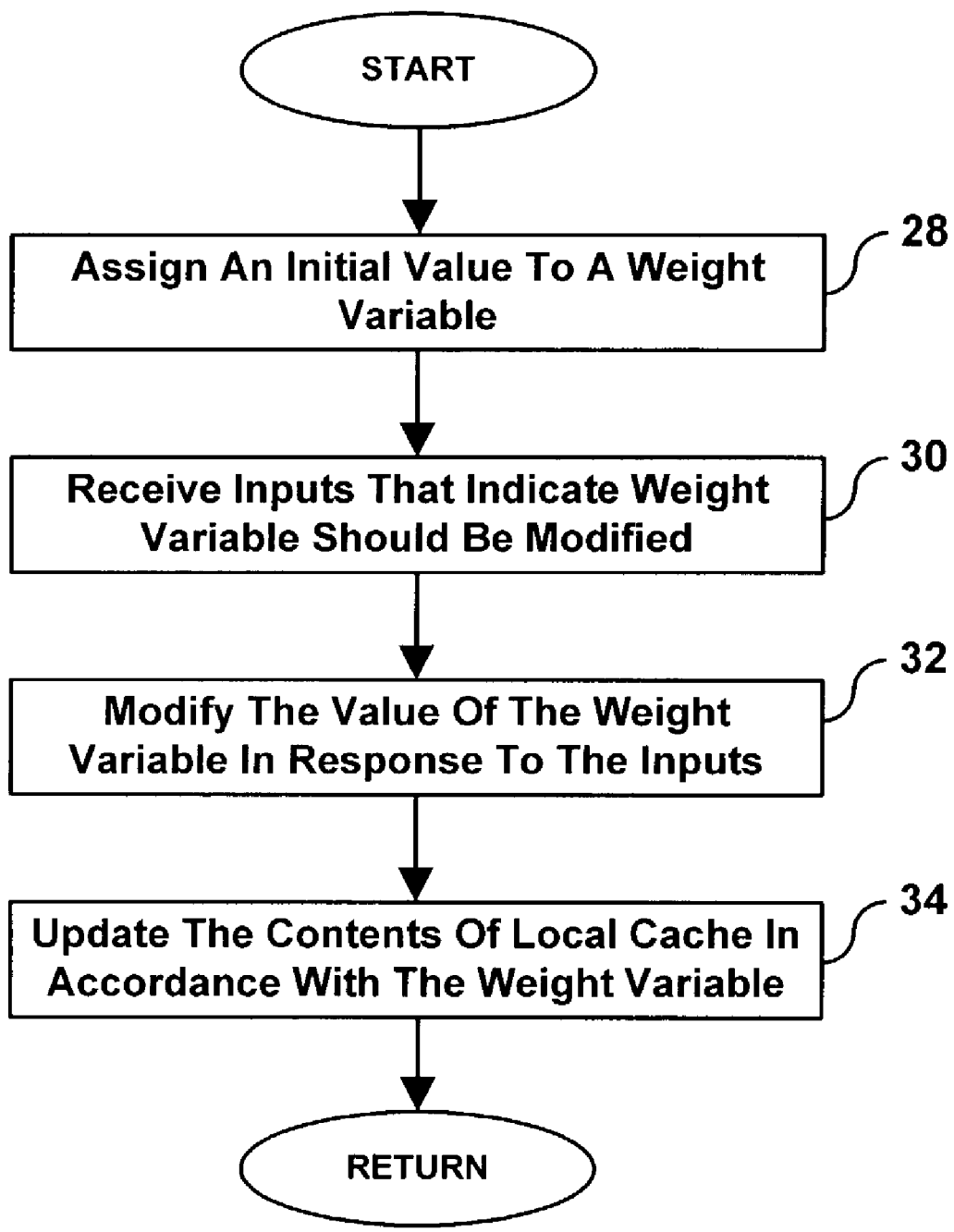
FIG. 3 is a flow chart illustrating the operation of the present system.

FIG. 3 is a flow chart of various functions that may be carried out in accordance with the exemplary embodiment. At block 28, caching server 18 receives an initial input of the expected modality (presentation mode), application size, and any other pertinent input for any particular content that is to be presented to users of the system. Such an initial input could include, for example, an expert setting of expected modality, historical data regarding modality, application size, time of day or geographic effects on modality, or similar variables.

For example, for an expert setting input, an administrator can set weight variables for presentation modes in various applications as a starting point, via an administrative interface using personal knowledge of applications and presentation modes that users are likely to employ. An initial input can also be made by an administrator referring to the historical data mentioned above, or alternatively, historical data can be transferred electronically from a database to caching server 18 as the result of a query from caching server 18 that is sent to a database server (not shown) upon initialization of server 18.

The expected modality can be different for different application states. Accordingly, caching server 18 could cause multimodal service node 10 to cache content for a single, particular application in voice mode for one application state or set of application states, while causing multimodal service node 10 to cache content in graphic mode for a different set of application states within the same application. For example, if most users (or if an administrator believes that most users) will provide input to a given application in voice mode, the caching server 18 can initially be configured to cause a multimodal service node in the system to cache all data required for voice mode for that application. If most users will probably choose to receive content from the application in graphic mode, the caching server can similarly cause the multimodal service node to cache content in graphic mode for the application states associated with the output sent to users.

The initial input of expected modality can be used to modify or set a weight variable for each application state of the application. The weight variable will determine the probability that content will be cached in a particular modality in an application state. For example, a weight variable for a particular application state that equals 1.0 could correspond to a 100% probability that content will be accessed in voice mode for a set of application states. Accordingly, a weight variable of 1.0 would result in the highest possible probability that content would be cached locally in voice mode.

Using a weight variable rather than a mechanism that forces content to be cached in a single presentation mode allows for the system to adapt to further input from users. It also allows for more flexible memory management, because content can be stored in all possible presentation modes when (or if) there is sufficient memory. Then, as memory at multimodal service nodes becomes full, content can be overwritten according to the probability that it will not be used.

At step 30, caching server 18 receives further input from multimodal service node 10 regarding presentation modes that are selected by users in conjunction with any number of variables such as the user's location, the time of day, application size, the amount of content that needs to be cached in one presentation mode versus another mode, and so forth. Caching server 18 similarly receives inputs from other multimodal service nodes in the system. As a result of all such inputs, the predictive caching software in caching server 18 can modify the value of weight variables, as shown at step 32, and the value of the weight variables for each presentation mode and application state can be transmitted to multimodal service node 10 and other multimodal service nodes in the system.

For example, if caching server 18 receives inputs that indicate graphic mode is the only presentation mode selected for application state "x" at a particular multimodal service node, the weight variable for graphic presentation mode for application state x will eventually reach 1.0 or another numeric value that indicates content should be always be cached in graphic presentation mode for application state x. If the weight variable started with an initial value less than 1.0, it would increase toward 1.0 each time a user selected the graphic presentation mode from a service node, and the updated value would be transmitted to the service node.

The weight variable determines the probability that content will be cached in a particular presentation mode, if it is to be cached at all. The data to be cached locally is updated as shown at step 34. Updating the cache can include adding, deleting, or refreshing the cache. As an example of how caching according to a weight variable could work, suppose multimodal service node 10 is configured to cache content of all requests in all presentation modes. In this example, if a user requested a weather report for Chicago in text format, service node 10 might cache the content for the weather report in text and voice presentation mode, although the weight variable for text mode would increase and the variable for voice mode would decrease.

In time, the available memory at service node 10 would be exhausted by all the cached content. Before the memory is filled, a caching algorithm in service node 10 that uses the weight variable from caching server 18 can run. The algorithm can be triggered by memory level or can run periodically regardless of memory level. The algorithm can purge content according to the weight variable associated with each file. The algorithm can be repeated until the memory used drops below a predetermined threshold level.

By using the size of content (e.g., file size for a given application state) as an input to the determination of the weight variable, a very large file with the same actual user preference as a rather small file might be assigned a much lower weight variable than the large file. It is thus easy to see that some small files may be cached continuously even though they are not often used because larger files would be deleted first. Logically, the algorithm (or part of it) could take the following form:

If cached content >threshold, then delete file with lowest weight variable; repeat.

Similarly, the weight variable can be used by the algorithm to ensure that content with a high weight variable is updated regularly. The logical steps for refreshing files could take the following form:

If time since last refresh >threshold, then refresh file with highest weight variable; repeat until all files with weight variables >threshold are refreshed.

If the weight variable or a user request indicates that content should be cached, multimodal service node 10 can request content from application server 16 or a neighbor cache, and that content can then be added to the cache. If the modified weight variable indicates that content should no longer be cached in a given presentation mode, the cache may be updated by deleting content cached in that presentation mode for an application state.

As described above, any application state can be accessed in more than one presentation mode, so the software generates a weight variable for each application state that indicates the presentation mode in which content should be cached.

Exemplary embodiments of the present system have been described above. Those skilled in the art will understand, however, that changes and modifications may be made to these embodiments without departing from the true scope and spirit of the invention, which is defined by the claims. The appended claims are not to be interpreted as including means-plus-function limitations, unless such a limitation is explicitly recited in a given claim using the phrases(s) "means for" and/or "step for."

I claim:

1. A method of optimizing delivery of multimodal content to a wireless device, the method comprising:
    a caching server receiving at least one input that indicates at least one preferred presentation mode for a multimodal application, wherein the at least one input comprises the result of an algorithm that uses as a parameter user preferred presentation modes associated with multimodal applications;
    the caching server modifying, in response to the at least one input, the value of a weight variable, so as to produce a modified weight variable;
    the caching server sending the modified weight variable to a multimodal service node; and
    the multimodal service node receiving the modified weight variable, associating the modified weight variable with a file stored in a local cache, and updating the contents of the local cache according to the modified weight variable, wherein updating the contents of the local cache according to the modified weight variable comprises refreshing the file stored in the local cache when (i) the time since the file was last refreshed is greater than a first threshold value, and (ii) the value of the modified weight variable associated with the file is greater than a second threshold value.

2. The method of claim 1, wherein updating the contents comprises adding content to the local cache.

3. The method of claim 1, wherein updating the contents further comprises deleting content from the local cache.

4. The method of claim 1, wherein the content added to the local cache is in the format of the at least one preferred presentation mode.

5. The method of claim 1, further comprising assigning an initial value to the weight variable.

6. The method of claim 5, wherein the initial value is determined by historical data regarding presentation mode for the multimodal application.

7. The method of claim 1, wherein the weight variable is modified based on a frequency of usage of a particular presentation mode for the multimodal application.

8. The method of claim 1, wherein the algorithm further uses as a parameter the amount of data that must be cached in a particular presentation mode for the multimodal application.

9. The method of claim 8, wherein the weight variable is modified based on the size of content of a particular presentation mode for the multimodal application.

10. A system for improving the delivery of multimodal content to a wireless device comprising:
    a predictive caching server;
    a multimodal service node;
    wherein the predictive caching server is arranged to (i) receive at least one input that indicates at least one preferred presentation mode for a multimodal application, the at least one input comprising the result of an algorithm that uses as a parameter user preferred presentation modes associated with multimodal applications, (ii) modify the value of a weight variable in response to the at least one input, so as to produce a modified weight variable, and (iii) transmit the modified weight variable to the multimodal service node;
    wherein the multimodal service node is arranged to (i) receive the modified weight variable, (ii) associate the modified weight variable with a file stored in a local cache, and (iii) update the contents of the local cache according to the modified weight variable; and
    wherein the multimodal service node is arranged to update the contents of the local cache according to the modified weight variable comprises the multimodal service node being arranged to refresh the file stored in the local cache when (i) the time since the file was last refreshed is greater than a first threshold value, and (ii) the value of the modified weight variable associated with the file is greater than a second threshold value.

11. The system of claim 10, wherein the at least one user input comprises an initial value assigned to the weight variable.

12. The system of claim 10, wherein the at least one input is sent from the multimodal service node.

13. The system of claim 10, wherein the multimodal service node is further arranged to transmit data to the wireless device, wherein the data is stored in the local cache.

14. The system of claim 10, wherein the at least one user input comprises a user selection of presentation mode.

15. The system of claim 10, wherein the at least one user input comprises a frequency of usage of a presentation mode for a multimodal application.

16. The predictive caching server of claim 10 further arranged to establish an initial value of the weight variable in accordance with an initial input.

* * * * *

UNITED STATES PATENT AND TRADEMARK OFFICE
CERTIFICATE OF CORRECTION

PATENT NO.       : 7,657,652 B1  
APPLICATION NO.  : 10/457308  
DATED            : February 2, 2010  
INVENTOR(S)      : Thenthiruperai S. Balaji Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1196 days.

Signed and Sealed this

Thirtieth Day of November, 2010

David J. Kappos  
*Director of the United States Patent and Trademark Office*